(12) United States Patent
Roeper (10) Patent No.: US 8,810,199 B2
(45) Date of Patent: Aug. 19, 2014

(54) CHARGE EQUALIZATION BETWEEN SERIES-CONNECTED BATTERY CELLS

(75) Inventor: Wolfgang Roeper, Neuenstein (DE)

(73) Assignee: Atmel Automotive GmbH, Heilbronn (DE)

( * ) Notice: Subject to any disclaimer, the term of this patent is extended or adjusted under 35 U.S.C. 154(b) by 356 days.

(21) Appl. No.: 13/247,240

(22) Filed: Sep. 28, 2011

(65) Prior Publication Data

US 2012/0074907 A1    Mar. 29, 2012

Related U.S. Application Data

(60) Provisional application No. 61/387,322, filed on Sep. 28, 2010.

(51) Int. Cl.
  *H01M 10/46* (2006.01)

(52) U.S. Cl.
  USPC ......................................... 320/116

(58) Field of Classification Search
  USPC .................. 320/107, 112, 116, 117, 118, 119
  See application file for complete search history.

(56) References Cited

U.S. PATENT DOCUMENTS

| | | | | |
|---|---|---|---|---|
| 3,979,764 A | * | 9/1976 | Arai | 257/272 |
| 5,536,977 A | * | 7/1996 | Williams | 307/43 |
| 6,087,740 A | * | 7/2000 | Williams | 307/125 |
| 2008/0191663 A1 | | 8/2008 | Fowler | |
| 2010/0127658 A1 | * | 5/2010 | Fazakas | 320/101 |

OTHER PUBLICATIONS

Wen, Sihua, "Cell Balancing Buys Extra Run Time and Battery Life," Analog Applications Journal, *1Q* 2009.
Kutkut, N. H. et al., "Dynamic Equalization Techniques for Series Battery Stacks," Telecommunications Energy Conference, 1996. *INTELEC '96.*, 18th International, Oct. 1996.
Bonfiglio, C. et al., "Cost Optimized Battery Management System with Active Cell Balancing for Lithium Ion Battery Stacks," Vehicle Power and Propulsion Conference, *VPPV '09*, Sep. 2009.
Office Action and English Translation of German Patent Application 10 2010 046 702.2, Jul. 29, 2011.

* cited by examiner

*Primary Examiner* — Edward Tso
(74) *Attorney, Agent, or Firm* — Baker Botts LLP (57) ABSTRACT

In one embodiment, a circuit comprising a first set of one or more semiconductor switches coupled to a first node and a first terminal of an energy store configured to store energy, and a second set of one or more semiconductor switches coupled to a second node and a second terminal of the energy store, each of the first and second sets of semiconductor switches being configured to couple to a terminal of a battery cell.

17 Claims, 3 Drawing Sheets

CHARGE EQUALIZATION BETWEEN SERIES-CONNECTED BATTERY CELLS

RELATED APPLICATIONS

This application claims the benefit, under 35 U.S.C. §119(e), of U.S. Provisional Patent Application No. 61/387,322, filed 28 Sep. 2010. This application also claims the benefit, under 35 U.S.C. §119(a), of German Patent Application No. 102010046702.2-32, also filed 28 Sep. 2010.

TECHNICAL FIELD

This disclosure relates to circuits.

BACKGROUND

A battery pack or cell pack (such as for example a Li-Ion cell pack) may have multiple battery cells connected in series.

DESCRIPTION OF EXAMPLE EMBODIMENTS

This disclosure provides a circuit and a method for charge equalization between series-connected battery cells.

N. H. Kutkut, *Dynamic Equalization Techniques for Series Battery Stacks*, 18TH INTERNATIONAL TELECOMMUNICATIONS ENERGY CONFERENCE, Oct. 6-10, 1996, teaches circuits for the dissipative and non-dissipative charge equalization of series-connected lithium-ion battery cells. Lithium-ion batteries are operated in frequent instances in rather large series circuits of many cells, so-called "stacks" in order to achieve a high total voltage. Since the cells are subject to a strong production leakage it is not possible without additional measures to optimally fully charge each individual cell. The weakest cell limits the energy that may be removed from the stack or charged into it on account of the series circuit. It is therefore desirable, in particular given the background of the high cost for lithium-ion battery cells, to utilize the capacity of the stack as optimally as possible. This becomes possible if it is successful by using additional measures to fully charge each individual cell of the series circuit in accordance with its maximal capacity during the charging process and to remove the entire energy during discharging.

In addition, the capacities of the cells diverge due to aging, self-charging and other leakage currents over time. This then has the result that the removable energy in the battery becomes smaller. The running time of the apparatus operated with it, such as in an electric car, therefore becomes shorter. In order to counteract this, the cells must be rebalanced again from time to time by a charge equalization.

"Passive balancing" is a method for charge equalization where the cells that are just before overcharging are discharged by resistors connected in parallel to the cell. However, in passive balancing, the entire excess energy is converted into heat due to energy losses. Recent methods operate with low-loss storage elements, such as with coils.

Sihua Wen, *Cell Balancing Buys Extra Run Time and Battery Life*, TEX . INSTRUMENTS INC., ANALOG APPLICATIONS J., 1Q 2009, teaches a circuit for charge equalization. Energy is pumped from a cell to the adjacent cell through the circuit by a coil and two metal-oxide semiconductor (MOS) field effect transistors (FETs) per battery cell. High equalization currents between adjacent cells are possible through the circuit. However, in the normal case the cell that should emit energy and the cell that must receive this energy are not directly adjacent to one another but rather separated from one another by a few cells. The charge must therefore be pumped in several cycles from cell to cell before it finally arrives where it is actually needed. This drastically reduces the total degree of effectiveness of the circuit and the equalization of the charges takes a long time.

C. Bonfiglio & W. Rössler, *A Cost optimized Battery Management System with Active Cell Balancing for Lithium Ion Battery Stacks*, VEHICLE POWER AND PROPULSION CONFERENCE, Sep. 7-10, 2009, also teaches a circuit for charge equalization. A large transmitter is used in the circuit that comprises a secondary winding for each battery cell. The single primary winding may be connected to the entire series circuit of the battery cells. The circuit permits either the energy from the stack to be removed and to be purposely pushed into any cell or permits the energy to be removed from any cell and to be fed back into the entire stack. The advantage of the circuit is that the cells may be treated in a purposeful manner. Large currents may be generated for the charge equalization. The required special transmitter is expensive and, in addition, limits the number of cells that may be equalized by the circuit.

Particular embodiments provide a circuit for charge equalization.

Particular embodiments provide a circuit for charge equalization between series-connected battery cells. In particular embodiments, in addition to the series-connected battery cells, the circuit requires a storage device for the storage of energy. In particular embodiments, an intermediate storage during the charge equalization is possible with the storage device. In particular embodiments, any energy storage device may be sufficient for the intermediate storage during the charge equalization. In particular embodiments the storage device may have at least one inductor. In particular embodiments, during the charge equalization, energy may be intermediately stored in the magnetic field of the inductor.

In particular embodiments, the circuit may comprise a selector adjusted to connect one of the battery cells to the storage device. In particular embodiments, the selector comprises first semiconductor switches and second semiconductor switches. The first semiconductor switches and the second semiconductor switches may be connected to terminals of the battery cells. The first semiconductor switches and the second semiconductor switches may also be connected to two terminals of the storage device. In particular embodiments, for example, the first semiconductor switches and the second semiconductor switches may be connected to the two terminals of the storage device via further structural elements, such as semiconductor switches. In particular embodiments, the first semiconductor switches and the second semiconductor switches may be connected on the two terminals of the storage device. In particular embodiments, the first semiconductor switches and the second semiconductor switches form a change-over switch for changing over between the battery cells, whereby the change-over function may also be designated as a multiplexer.

In particular embodiments, the circuit may comprise a control apparatus for controlling a first selection of a first battery cell from several battery cells. The selection may be based on different input magnitudes. In particular embodiments, for example, the selection is determined by the control apparatus using measured data, such as measured cell voltages. In particular embodiments, the selection may take place in a time-controlled manner, for example, cyclically. In particular embodiments, the selected first battery cell may be charged or discharged. In particular embodiments, energy is taken from the selected first battery cell and given off into the storage device or energy is taken from the storage device and given off into the selected first battery cell.

In particular embodiments, the control apparatus is adjusted to temporarily control a first connected connection by regulating the first semiconductor switch and to temporarily regulate a second connected connection by regulating the second semiconductor switch between both terminals of the selected battery cell and between the two terminals of the storage device. Both necessary connections for charging or discharging the selected first battery cell are therefore switched by the first and the second semiconductor switch so that the battery cell is not permanently wired to any terminal of the storage device.

Figure 4:
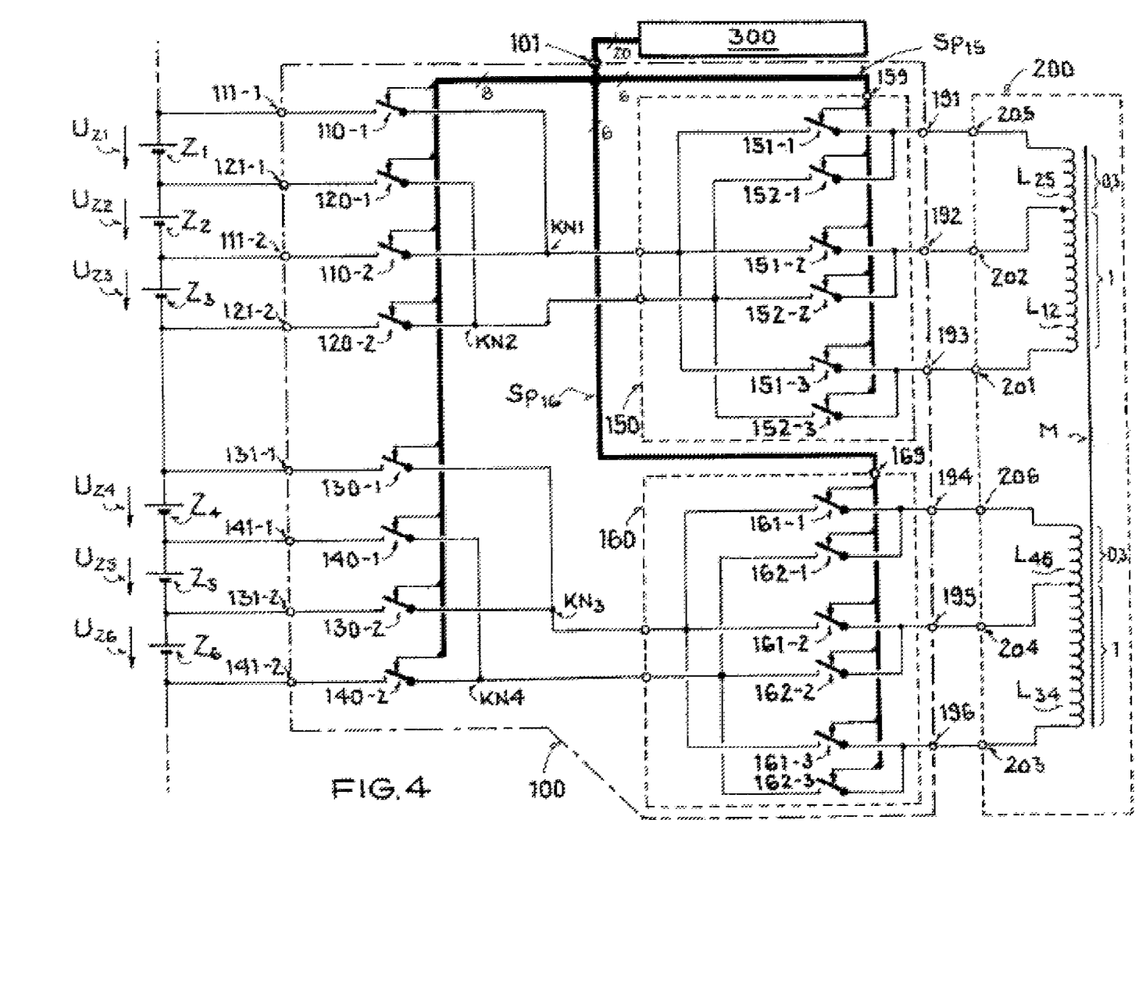
FIG. 4 shows a schematic block circuit diagram of a third example embodiment of the circuit for charge equalization.

In particular embodiments, the selector makes it possible to transmit energy from any battery cell into the storage device. In particular embodiments, charge among the battery cells may be exchanged, almost as desired, by the formation of the selector for switching the first and the second connection. The first and the second semiconductor switches make possible the transmission of energy in both directions, so that each battery cell may be charged or discharged individually. As a result, the entire stack may be balanced in a short amount of time. In particular embodiments, each battery cell in the stack may be fully charged to the maximum. This may increase the range electric cars or a cheaper battery type may be used. FIG. 4 shows a schematic block circuit diagram of a third example embodiment of the circuit for charge equalization. Particular embodiments are especially economical because relatively few standard structural elements are used. In an example embodiment illustrated in FIG. 4, a single separate transmitter may be required and all other structural elements may be monolithically integrated onto a single semiconductor chip.

Particular embodiments provide a method for charge equalization between series-connected battery cells.

In particular embodiments, at least one cell voltage of the battery cells is determined by the control device. In particular embodiments, the control device may determine a first battery cell of the battery cells for discharging or charging.

In particular embodiments, the first and second semiconductor switches are regulated for the selection of the determined first battery cell by the control device.

In particular embodiments, the first semiconductor switches and the second semiconductor switches are isochronously regulated by the control device for switching a first connection and a second connection between both terminals of the selected first accumulator cell and between two terminals of a storage device.

In particular embodiments, the selector may comprise a first node and a second node. The first semiconductor switches are connected to the first node and the second semiconductor switches are connected to the second node. In particular embodiments, the cell voltage of the selected first battery cell is switched onto the first node and the second node by the changing over by the first semiconductor switches and by the second semiconductor switches. In particular embodiments, the charging current or discharging current of the first battery cell flows through the first node and through the second node.

In particular embodiments, as a result of the selection of different battery cells, different potentials may occur in the first node and in the second node that may be higher or lower than the potentials on the terminals of the battery cells. In particular embodiments, at least one of the first semiconductor switches or the second semiconductor switches comprises two FETs that are wired anti-serially.

In particular embodiments, the first semiconductor switches and the second semiconductor switches are monolithically integrated in an integrated circuit. In particular embodiments, the first semiconductor switches and the second semiconductor switches are connected directly to housing terminals in order to minimize dissipations.

In particular embodiments, the control apparatus may be adjusted for the isochronous closing of one semiconductor switch of the first semiconductor switches and one semiconductor switch of the second semiconductor switches. In particular embodiments, the closing brings about the first switched connection and the second switched connection, during which several semiconductor switches do not have to be closed in series. In particular embodiments shown in FIG. 1, only the closing resistors of the closed semiconductor switches dominate the losses. In particular embodiments, for example, the closing resistor is 1 ohm, so that a discharge/loading current of 100 mA may be switched.

In particular embodiments, the control apparatus is arranged for controlling a time for the closing of a semiconductor switch of the first semiconductor switches and for the closing of a second semiconductor switch of the second semiconductor switches as a function of an inductor value of the at least one inductor. In particular embodiments, for example, a selection may be made between different times by appropriate programming. In particular embodiments, the time may be adjusted using measured data.

In particular embodiments, the first semiconductor switches and the second semiconductor switches may be adjusted not only for changing over between the battery cells but also for changing over the polarity. In particular embodiments, the control apparatus may be adjusted for discharging a first battery cell by switching a first cell voltage of the first cell onto the two terminals of the storage device and for charging a second battery cell by switching a second cell voltage of the second battery cell with reverse polarity onto the two terminals of the storage device. In particular embodiments, the storage device may have only a single inductor.

In particular embodiments, the storage device may have at least a first inductor and a second inductor. In particular embodiments, the first inductor and the second inductor may be coupled in a transformer-like manner. In particular embodiments, for example, the first inductor forms a first coil and the second inductor forms a second coil, whereby the first coil and the second coil may be coupled by a material with a high magnetic conductivity, such as ferrite. In particular embodiments, the storage device may have a transmitter with the first inductor, which may be designated as a primary winding, and with the second inductor, which may be designated as a secondary winding.

In particular embodiments, the first inductor may be connected to the two terminals of the storage device. In particular embodiments, the storage device may have two other terminals to which the second inductor is connected. In particular embodiments, the selector comprises third semiconductor switches and fourth semiconductor switches. In particular embodiments, the third semiconductor switches and the fourth semiconductor switches may be connected to the two further terminals of the storage device or directly connected to them.

In particular embodiments, the control apparatus may be adjusted to control a third switched connection by regulating the third semiconductor switches and to control a fourth switched connection between both terminals of the second selected battery cell and between the other two terminals of the storage device by regulating the fourth semiconductor switches. In particular embodiments, for example, a simultaneous discharging of the first battery cell and a charging of the second battery cell may take place as a result of this.

In particular embodiments, the selector may comprise at least one inverter/synchronous rectifier apparatus. In particular embodiments, the inverter/synchronous rectifier apparatus may have the function of an inverter as well as the function of a synchronous rectifier. An inverter generates an alternating voltage/alternating current from a direct voltage/direct current. A synchronous rectifier generates a direct voltage/direct current from an alternating voltage/alternating current. In particular embodiments, the inverter/synchronous rectifier apparatus comprises semiconductor switches having functionality of the inverter and of the synchronous rectifier.

In particular embodiments, the control apparatus may be preferably adjusted to control the inverter/synchronous rectifier apparatus by a periodic control signal. In particular embodiments, the semiconductor switches may be switched by the periodic control signal. In particular embodiments, the inverter/synchronous rectifier apparatus may be adjusted to cyclically change a polarity of a cell voltage on the two terminals of the storage device as a function of the periodic control signal.

In particular embodiments, the storage device has at least one first inductor and one second inductor. In particular embodiments, the first inductor and the second inductor may be coupled in a transformer-like manner. In particular embodiments, the selector has a first inverter/synchronous rectifier apparatus that may be connected to the first inductor. In particular embodiments, the first inverter/synchronous rectifier apparatus may be directly connected to the first inductor. In particular embodiments, the selector may have a second inverter/synchronous rectifier apparatus that may be connected to the second inductor. In particular embodiments, the second inverter/synchronous rectifier apparatus may be connected directly to the second inductor. In particular embodiments, the control apparatus may be adjusted to isochronously control the first inverter/synchronous rectifier apparatus as an inverter and to control the second inverter/synchronous rectifier apparatus as a synchronous rectifier by periodic control signals. In particular embodiments, the control apparatus may be adjusted to isochronously control the second inverter/synchronous rectifier apparatus as an inverter and to control the first inverter/synchronous rectifier apparatus as a synchronous rectifier by periodic control signals.

Particular embodiments may be combined with each other. In order to simply the discussion, a few possible combinations are explained in the description of the example embodiments of the figures. However, there are many possible combinations of particular embodiments.

Figure 1:
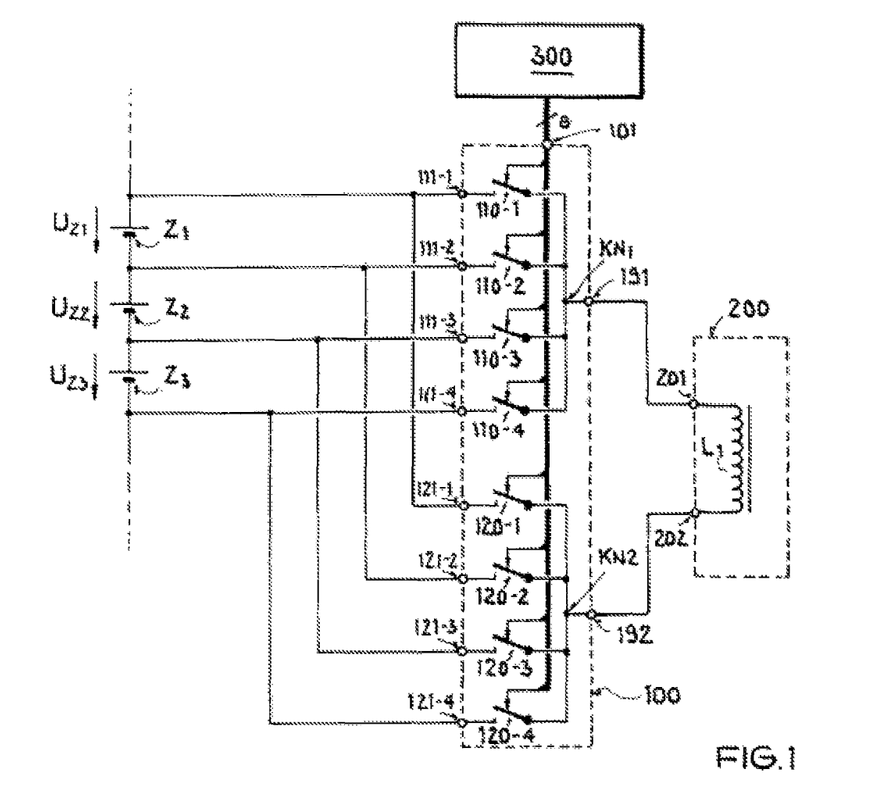
FIG. 1 shows a schematic block circuit diagram of a first example embodiment of a circuit for charge equalization.

FIG. 1 schematically shows an example circuit for the charge equalization with a block circuit diagram. The circuit is shown, by way of example, for three battery cells $Z_1$, $Z_2$ and $Z_3$. Particular embodiments, for example, may be readily expanded to a larger number of battery cells, such as sixteen battery cells. Battery cells $Z_1$, $Z_2$, $Z_3$ are connected in series, whereby the cell voltages $U_{Z1}$, $U_{Z2}$, $U_{Z3}$ of cells $Z_1$, $Z_2$, $Z_3$ are added to each other. In particular embodiments, for the equalization of a different charge of battery cells $Z_1$, $Z_2$, $Z_3$ a first cell $Z_1$ with a higher charge may be discharged and a second cell $Z_2$ with a low charge may be charged by a discharge of the first cell $Z_1$. During the charging and discharging procedures the dissipation should be as small as possible.

In particular embodiments, the circuit comprises a storage device 200 for storing energy. In the example embodiment of FIG. 1, storage device 200 may be a coil that forms inductor $L_1$. The coil may be wound, for example, on a ferrite core. In particular embodiments, storage device 200 may also have another storage means, such as a capacitor.

In particular embodiments, the circuit comprises a selector 100 adjusted to connect one of battery cells to storage device 200. In particular embodiments, selector 100 comprises first semiconductor switches 110-1, 110-2, 110-3, 110-4 and second semiconductor switches 120-1, 120-2, 120-3, 120-4. Each first semiconductor switch 110-1, 110-2, 110-3, 110-4 is connected to a first terminal 111-1, 111-2, 111-3, 111-4 so that the first semiconductor switches 110-1, 110-2, 110-3, 110-4 are connected to terminals of battery cells $Z_1$, $Z_2$, $Z_3$. In particular embodiments, each first semiconductor switch 110-1, 110-2, 110-3, 110-4 is connected to a first node $KN_1$. In the example embodiment of FIG. 1, the first node $KN_1$ is connected for its part to a terminal 191 on the storage device side so that the first node $KN_1$ is directly connected to a first terminal 201 of storage device 200.

In particular embodiments, each second semiconductor switch 120-1, 120-2, 120-3, 120-4 is connected to a second terminal 121-1, 121-2, 121-3, 121-4 so that the second semiconductor switches 120-1, 120-2, 120-3, 120-4 are connected to terminals of battery cells $Z_1$, $Z_2$, $Z_3$. In particular embodiments, each second semiconductor switch 120-1, 120-2, 120-3, 120-4 is connected to the second node $KN_2$. In the example embodiment of FIG. 1, the second node $KN_2$ is connected for its part to a terminal 192 on the storage device side so that the second node $KN_2$ is directly connected to a second terminal 202 of storage device 200.

In particular embodiments, the circuit comprises a control apparatus 300 for controlling a first selection of a first battery cell. In particular embodiments, for example, a first selection of a first battery cell may be a first selection of battery cell $Z_1$. In particular embodiments, the first selection takes place by control apparatus 300 regulating a semiconductor switch, such as semiconductor switch 110-1 of the first semiconductor switches 110-1, 110-2, 110-3, 110-4 and regulating a semiconductor switch, such as semiconductor switch 120-2 of the second semiconductor switches 120-1, 120-2, 120-3, 120-4. In particular embodiments, the control for the first selection takes place here in order to take energy out of the first battery cell $Z_1$ and deliver it into storage device 200.

In particular embodiments, a second selection is made by control apparatus 300 regulating another semiconductor switch, such as semiconductor switch 110-3 of the first semiconductor switches 110-1, 110-2, 110-3, and 110-4 and regulating another semiconductor switch, such as semiconductor switch 120-2 of the second semiconductor switches 120-1, 120-2, 120-3, and 120-4. In particular embodiments, the control for the second selection takes place here in order to take energy out of storage device 200 and deliver it into another battery cell, such as battery cell $Z_2$. In particular embodiments, the inverse of this also applies, so that charge may be taken from the second battery cell $Z_2$, intermediately stored in storage device 200, and loaded into the first battery cell $Z_i$. In particular embodiments, every other battery cell may also be individually charged or discharged in this manner.

In particular embodiments, in order to charge or discharge battery cells $Z_1$, $Z_2$, and $Z_3$, the control apparatus 300 may be adjusted to temporarily control a first switched connection between a first terminal of the selected first battery cell, such as battery cell $Z_1$, and between the first terminal 201 of storage device 200 by regulating the first semiconductor switches 120-1, 120-2, 120-3, and 120-4. In particular embodiments, the control apparatus 300 isochronously controls a second switched connection between a second terminal of the selected battery cell $Z_1$ and between the second terminal 202 of storage device 200 by regulating the second semiconductor switches 120-1, 120-2, 120-3, and 120-4. In particular embodiments, the control apparatus 300 may control semiconductor switches 110-1 and 120-2 into a closed state. In particular embodiments, control apparatus 300 may control the other semiconductor switches 110-2, 110-3, 110-4 and 120-1, 120-3, 120-4 isochronously into an open state.

In particular embodiments, care is to be taken that the inductor $L_1$ of storage device 200 stores energy only to a limited extent until a magnetic field has been built up. In particular embodiments, control apparatus 300 may be adjusted so as to control a time for closing the first semiconductor switch, such as semiconductor switch 110-1, and the second semiconductor switch, such as semiconductor switch 120-2, as a function of an inductor value of inductor $L_1$.

Figure 2A:
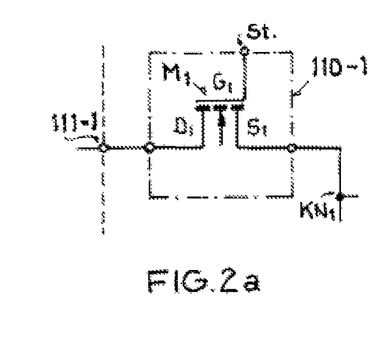
FIG. 2a shows a first example embodiment of a semiconductor switch.
Figure 2B:
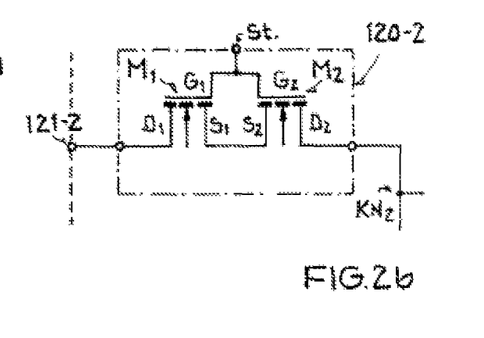
FIG. 2b shows a second example embodiment of a semiconductor switch.

In particular embodiments, control apparatus 300 may be adjusted, for discharging a first battery cell $Z_1$ by switching a first cell voltage $U_{Z1}$ of the first cell $Z_1$ onto the first terminal 201 and onto the second terminal 202 of storage device 200. In the example embodiment of FIG. 2, semiconductor switches 110-1 and 120-2 are closed so that there is a higher potential on first terminal 201 of storage device 200 and a lower potential on second terminal 202. In particular embodiments, a discharge current flows from the first terminal 201 through inductor $L_1$ to the second terminal 202 of storage device 200 (technical current direction).

In particular embodiments, the current generated by the magnetic field in inductor $L_1$ must flow in the correct direction through second battery cell $Z_2$ in order for the second battery cell $Z_2$ to be charged with the energy stored in inductor $L_1$ of storage device 200. In particular embodiments, in order to charge second battery cell $Z_2$, control apparatus 300 may be adjusted for switching a second cell voltage $U_{Z2}$ of the second battery cell $Z_2$ with inverse polarity onto the first terminal 201 and onto the second terminal 202 of storage device 200. In the example embodiment of FIG. 2, semiconductor switches 110-3 and 120-2 are closed, so that the current generated by the magnetic field of inductor $L_1$ flows through second terminal 202 of storage device 200, via second node $KN_2$, through second battery cell $Z_2$ via first node $KN_1$, to first terminal 201 of storage device 200 (technical current direction).

In particular embodiments, a voltage may drop over every closed semiconductor switch according to the open or closed state of the first and second semiconductor switches 110-1, 110-2, 110-3, 110-4, 120-1, 120-2, 120-3, and 120-4. In particular embodiments, each semiconductor switch must have a blocking voltage that exceeds every dropping voltage possible in normal operation. In particular embodiments, in the case of semiconductor switches 110-2, 110-3, 120-2, and 120-3 for middle battery cell $Z_2$, positive as well as negative voltages may occur in the series circuit over the particular semiconductor switches 110-2, 110-3, 120-2, and 120-3.

FIG. 2a shows an example embodiment of a semiconductor switch 110-1 in which a voltage drops in only one direction in the closed state on account of the wiring. In particular embodiments, only a single MOSFET is needed. In particular embodiments, the transistor is constructed, for example, as a high-voltage MOSFET with a gate $G_1$, a drain $D_1$, and a source $S_1$. In particular embodiments, FIG. 2b shows an example embodiment of a semiconductor switch 120-2 in which voltages in both directions may occur in the closed state. In particular embodiments, at least one of the first semiconductor switches 110-2, 110-3 or of the second semiconductor switches 120-2, 120-3 has two FETs wired in an anti-serial manner. In particular embodiments, the first source $S_1$ of the first FET $M_1$ may be connected to the second source $S_2$ of the second FET $M_2$. In particular embodiments, the first gate $G_1$ and the second gate $G_2$ may be connected to one another. In particular embodiments, the first drain $D_1$ may be connected to terminal 121-2 and the second drain $D_2$ to second node $KN_2$.

In FIG. 1, the first semiconductor switches 110-1, 110-2, 110-3, 110-4 and the second semiconductor switches 120-1, 120-2, 120-3, 120-4 are monolithically integrated together with control apparatus 300 in an integrated circuit. The integrated circuit comprises several housing terminals to which the battery cells and storage device 200 may be connected. In particular embodiments, the first semiconductor switches 110-1, 110-2, 110-3, 110-4 and the second semiconductor switches 120-1, 120-2, 120-3, 120-4 are connected directly to the housing terminals by wirings of the circuit in order to minimize dissipations.

In FIG. 1, only a single external coil may be needed, and in particular embodiments, all other structural elements may be integrated on a semiconductor chip. In particular embodiments, the example circuit of FIG. 1 may have a high degree of efficiency. In particular embodiments, each cell may be individually charged or discharged.

Figure 3:
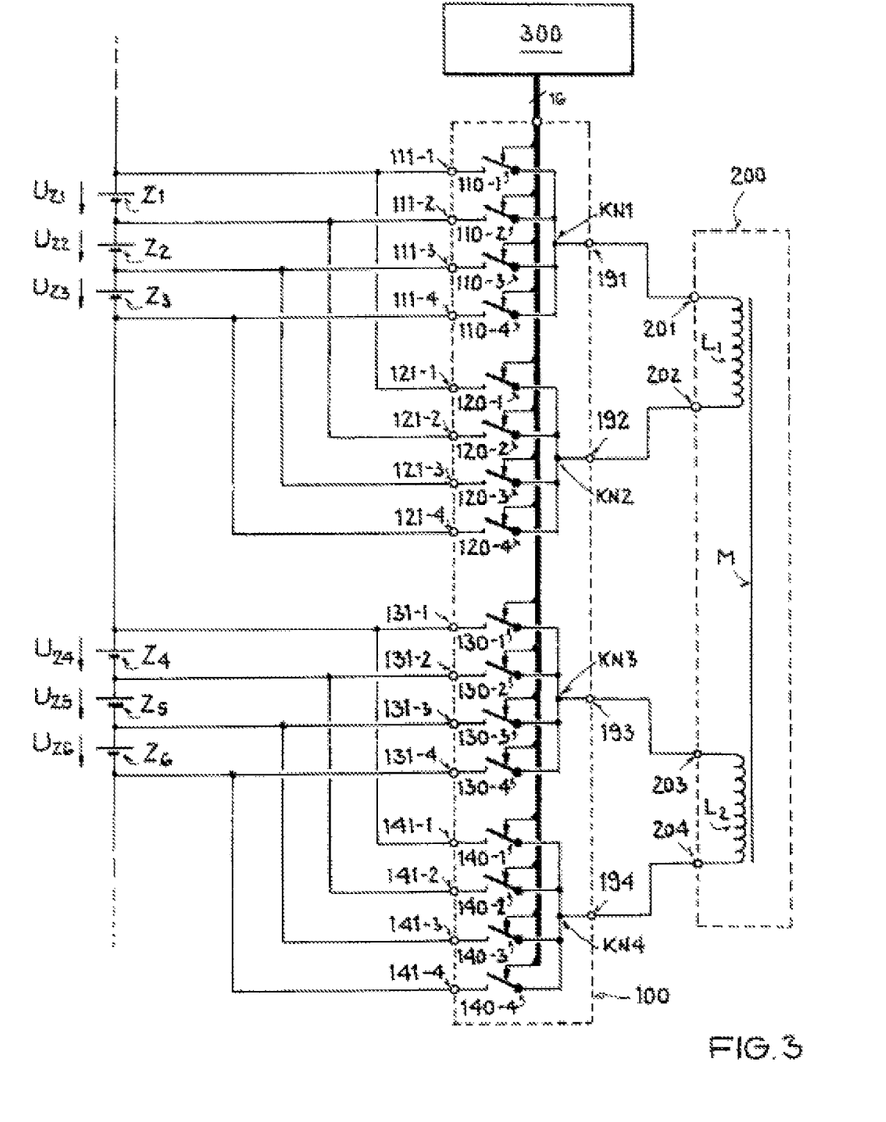
FIG. 3 shows a schematic block circuit diagram of a second example embodiment of a circuit for charge equalization.

A second example embodiment is shown as a schematic block diagram in FIG. 3. By way of example, six battery cells $Z_1, Z_2, Z_3, Z_4, Z_5, Z_6$ are wired in a series circuit. In particular embodiments, the storage device 200 has a second inductor $L_2$ that is connected to a third terminal 203 and to a fourth terminal 204 of storage device 200. In particular embodiments, the first inductor $L_1$ and the second inductor $L_2$ may be coupled like a transformer M in that a first coil forming the first inductor $L_1$ and the second coil forming the second inductor $L_2$ may be wound on the same magnetic conductor.

In particular embodiments, in addition to the first semiconductor switches 110-1, 110-2, 110-3, 110-4 and the second semiconductor switches 120-1, 120-2, 120-3, 120-4, selector 100 in FIG. 3 comprises third semiconductor switches 130-1, 130-2, 130-3, 130-4 and fourth semiconductor switches 140-1, 140-2, 140-3, 140-4. The third semiconductor switches 130-1, 130-2, 130-3, 130-4 are connected to a third node $KN_3$ and the fourth semiconductor switches 140-1, 140-2, 140-3, 140-4 are connected to a fourth node $KN_4$.

In particular embodiments, if charge is to be transferred from the first battery cell $Z_1$ to the fourth battery cell $Z_4$, first semiconductor switches 110-1 and 120-2 may be closed by control apparatus 300 in order to build up a magnetic field by a flow of current through first inductor $L_1$ of storage device 200 in order to intermediately store the energy by means of the magnetic field. In particular embodiments, the energy may also be taken from the second inductor $L_2$ by transformer-like coupling M and charged, for example, into fourth battery cell $Z_4$. In particular embodiments, a removal again by first inductor $L_1$ is possible.

In particular embodiments, control apparatus 300 may be adjusted to control a switched third connection between a first terminal of a second selected battery cell (here $Z_4$) and between the third terminal 203 of storage device 200 by regulating third semiconductor switches 130-1, 130-2, 130-3, 130-4, and to control a fourth switched connection between a second terminal of the second selected battery cell (here $Z_4$)

and between the fourth terminal 204 of storage device 200 by regulating the fourth semiconductor switches 140-1, 140-2, 140-3, 140-4.

FIG. 4 shows a schematic block circuit diagram of a third example embodiment of the circuit for charge equalization. In particular embodiments, selector 100 may comprise first semiconductor switches 110-1, 110-2, second semiconductor switches 120-1, 120-2, third semiconductor switches 130-1, 130-2 and fourth semiconductor switches 140-1, 140-2. In particular embodiments, the first semiconductor switches 110-1, 110-2 are connected to a first node $KN_1$, the second semiconductor switches 120-1, 120-2 are connected to a second node $KN_2$, the third semiconductor switches 130-1, 130-2 are connected to a third node $KN_3$ and the fourth semiconductor switches 140-1, 140-2 are connected to a fourth node $KN_4$.

In particular embodiments, storage device 200 may have a first inductor with two partial inductors $L_{12}$ and $L_{25}$. In particular embodiments, partial inductor $L_{12}$ may be connected to a first terminal 201 and to a second terminal 202 of storage device 200. In particular embodiments, partial inductor $L_{25}$ may be connected to the second terminal 202 and to a fifth terminal 205 of storage device 200.

In particular embodiments, storage device 200 may have a second inductor with two partial inductors $L_{34}$ and $L_{46}$. In particular embodiments, partial inductor $L_{34}$ may be connected to a third terminal 203 and to a fourth terminal 204 of storage device 200. In particular embodiments, partial inductor $L_{46}$ may be connected to the fourth terminal 204 and to a sixth terminal 206 of storage device 200.

In particular embodiments, the first inductor and the second inductor are coupled in a transformer-like manner M. In particular embodiments, a transformation ratio not equal to one may be generated in both directions by the two partial inductors $L_{12}$ and $L_{25}$ of the first inductor and by the two partial inductors $L_{34}$ and $L_{46}$ of the second inductor. In particular embodiments, a transformation ratio not equal to one may be, for example, 1:1.3. In particular embodiments, a higher output voltage may be emitted by an output-side series circuit of the particular two partial inductors, such as $L_{34}$ and $L_{46}$, for charging the selected battery cell, such as $Z_4$.

In particular embodiments, a control apparatus 300 may control a first selection of a first battery cell, such as $Z_2$. In particular embodiments, energy may be taken from the first battery cell $Z_2$ and delivered into storage device 200. In particular embodiments, upon the selection of a second battery cell, such as $Z_5$, the energy stored in storage device 200 may be delivered into the second battery cell $Z_5$.

In particular embodiments, energy may be taken from the second battery cell $Z_5$ and intermediately stored in storage device 200, whereby control apparatus 300 is again adjusted for controlling the first selection of the first battery cell $Z_2$ in order to take energy out of storage device 200 and deliver it into the first battery cell $Z_2$.

In particular embodiments, the selection of the first battery cell $Z_1$, $Z_2$ or $Z_3$ or of the second battery cell $Z_4$, $Z_5$, or $Z_6$ may be controlled by control apparatus 300. In particular embodiments, control apparatus 300 may be adjusted to control a first switched connection by regulating the first semiconductor switches 110-1, 110-2, and to control a second switched connection between both terminals of the selected first battery cell $Z_1$, $Z_2$ or $Z_3$ and between the two terminals 201, 202 of storage device 200 by regulating the second semiconductor switches 120-1, 120-2, whereby, for example, the selected first battery cell, such as $Z_3$, is discharged.

In particular embodiments, selector 100 comprises a first inverter/synchronous rectifier apparatus 150 with semiconductor switches 151-1, 152-1, 151-2, 152-2, 151-3, and 152-3 that is connected to the first node $KN_1$ and to the second node $KN_2$ and therefore to the first semiconductor switches 110-1, 110-2 and to the second semiconductor switches 120-1, 120-2. In particular embodiments, the control terminal 159 of the first inverter/synchronous rectifier apparatus 150 is connected to control apparatus 300. In particular embodiments, the first inverter/synchronous rectifier apparatus 150 is controlled by control apparatus 300 by means of a periodic control signal $S_{P15}$. In particular embodiments, semiconductor switches 151-2 and 152-3 may be closed by periodic control signal $S_{P15}$ in a first part of the period and in a second part of the period semiconductor switches 152-2 and 151-3 are closed. In particular embodiments, semiconductor switches 151-1 and 152-1 may be controlled in an open state. In particular embodiments, an alternating voltage is on partial inductor $L_{12}$ of the first inductor of storage device 200, which may bring about an alternating current through partial inductor $L_{12}$. In particular embodiments, the alternating current through partial inductor $L_{12}$ may generate an alternating magnetic field that induces a voltage in the second inductor of storage device 200, and thus, in partial inductors $L_{34}$ and $L_{46}$.

In particular embodiments, selector 100 comprises third semiconductor switches 130-1, 130-2 and fourth semiconductor switches 140-1, 140-2. In particular embodiments, control apparatus 300 may be adjusted to control the third semiconductor switches 130-1, 130-2 and fourth semiconductor switches 140-1, 140-2. In particular embodiments, control device 300 is adjusted to control a third switched connection by regulating the third semiconductor switches 130-1, 130-2, and to control a fourth switched connection between both terminals of the second selected battery cell, such as $Z_5$, and between the other two terminals 203, 206 of storage device 200 by regulating the fourth semiconductor switches 140-1, 140-2.

In particular embodiments, an induced alternating voltage may be on the series circuit of partial inductors $L_{34}$ and $L_{46}$ of the second inductor of storage device 200, which brings about an alternating current through partial inductors $L_{34}$ and $L_{46}$. In particular embodiments, selector 100 comprises a second inverter/synchronous rectifier apparatus 160 with semiconductor switches 161-1, 162-1, 161-2, 162-2, 161-3 and 162-3 that is connected to the third node $KN_3$ and to the fourth node $KN_4$, and therefore to the third semiconductor switches 130-1, 130-2 and to the fourth semiconductor switches 140-1, 140-2. In particular embodiments, the second inverter/synchronous rectifier apparatus 160 may function as a synchronous rectifier. In particular embodiments, control terminal 169 of the second inverter/synchronous rectifier apparatus 160 may be connected to control apparatus 300. In particular embodiments, the second inverter/synchronous rectifier apparatus 160 may be controlled by control apparatus 300 by means of a second periodic control signal $Sp_{16}$. In a first partial period, semiconductor switches 161-1 and 162-3 may be closed by the second periodic control signal $Sp_{16}$ and in a second partial period, the semiconductor switches 162-1 and 161-3 may be closed by the second periodic control signal $Sp_{16}$. In particular embodiments, semiconductor switches 161-2 and 162-2 may be controlled in an open state. In particular embodiments, the alternating current may be rectified by the controlling of semiconductor switches 161-1, 161-3 and 162-1, 162-3 and flows back as direct current via the third node $KN_3$, the second selected battery cell, such as $Z_5$, and via the fourth node $KN_4$ (technical direction of current).

In particular embodiments, control apparatus 300 may be adjusted to isochronously control the first inverter/synchronous rectifier apparatus 150 as an inverter and the second inverter/synchronous rectifier apparatus 160 as a synchronous rectifier by means of the periodic control signals $S_{P15}$, $S_{P16}$. In particular embodiments, an inverse control may also be possible in that the second inverter/synchronous rectifier apparatus 160 may be controlled as an inverter and the first inverter/synchronous rectifier apparatus 150 may be controlled as a synchronous rectifier by means of the periodic control signals $S_{P15}$, $S_{P16}$. In particular embodiments, control apparatus 300 may be set to adjust a current strength of the discharge current or charging current by controlling the keying ratio of the periodic control signal $S_{P15}$, $S_{P16}$.

Particular embodiments provide a greater or lesser number of battery cells, whereby the number of the first, second, third and fourth semiconductor switches of the selector is adapted in accordance with the number of battery cells. The example circuit in FIG. 4 may be used for a motor vehicle, such as an electric car.

The following is a list of reference symbols and numbers in FIGS. 1 to 4, provided for example illustration purposes only and not by way of limitation:

| | |
|---|---|
| 100 | Selector |
| 101, 111-1, 111-2, 121-1, 121-2, 121-3, 121-4, 131-1, 131-2, 131-3, 131-4, 141-1, 141-2, 141-3, 141-4, 159, 169, 191, 192, 193, 194, 195, 196, 201, 202, 203, 204, 205, 206 | Terminal |
| 110-1, 110-2, 110-3, 110-4, 120-1, 120-2, 120-3, 120-4, 130-1, 130-2, 130-3, 130-4, 140-1, 140-2, 140-3, 140-4, 151-1, 151-2, 151-3, 152-1, 152-2, 152-3, 161-1, 161-2, 161-3, 162-1, 162-2, 162-3 | Semiconductor switch |
| 150, 160 | Inverter/synchronous rectifier apparatus |
| 200 | Storage device |
| 300 | Control apparatus |
| $D_1, D_2$ | Drain |
| $G_1, G_2$ | Gate |
| $KN_1, KN_2, KN_3, KN_4$ | Node |
| $L_1, L_2, L_{12}, L_{25}, L_{34}, L_{46}$ | Inductor |
| M | Transformer-like coupling |
| $M_1, M_2$ | FET |
| $S_1, S_2$ | Source |
| St, $S_{P15}$, $S_{P16}$ | Control signal |
| $U_{Z1}, U_{Z2}, U_{Z3}, U_{Z4}, U_{Z5}, U_{Z6}$ | Cell voltage |
| $Z_1, Z_2, Z_3, Z_4, Z_5, Z_6$ | Battery cell |

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A circuit comprising:
   a first set of one or more semiconductor switches coupled to a first node and a first terminal of an energy store configured to store energy;
   a second set of one or more semiconductor switches coupled to a second node and a second terminal of the energy store, the first and second sets of semiconductor switches coupled to a first battery cell; and
   the first battery cell coupled in series to a second battery cell, the second battery cell coupled to the first and second sets of semiconductor switches;
   wherein the first and second sets of semiconductor switches are configured to:
   discharge a first voltage of the first battery cell into the energy store; and
   reverse a polarity of the first and second nodes to charge the second battery cell.

2. The circuit of claim 1, further comprising a controller coupled to the first and second sets of semiconductor switches, the controller configured to:
   control a first switched connection by regulating the first set of one or more semiconductor switches; and
   control a second switched connection by regulating the second set of one or more semiconductor switches.

3. The circuit of claim 1, further comprising a controller coupled to the first and second sets of semiconductor switches, the controller configured to:
   select to discharge the first battery cell based on a first cell voltage of the first battery cell;
   select to charge the second battery cell based on a second cell voltage of the second battery cell;
   discharge a first voltage of the first battery cell into the energy store by controlling the first and second sets of semiconductor switches; and
   reverse a polarity of the first and second nodes to charge the second battery cell by controlling the first and second sets of semiconductor switches.

4. The circuit of claim 1, wherein the energy store comprises a first inductor for storing energy.

5. The circuit of claim 4, the energy store further comprising a second inductor for storing energy, wherein the first and second inductors are coupled in a transformer-like manner.

6. The circuit of claim 4, wherein the controller sets a time for closing the first and second sets of semiconductor switches based on an inductor value of the first inductor.

7. The circuit of claim 1, further comprising:
   a first inverter-synchronous rectifier coupled to the first and second nodes;
   a third set of one or more semiconductor switches coupled to a third node;
   a fourth set of semiconductor switches coupled to a fourth node; and
   a second inverter-synchronous rectifier coupled to the third and fourth nodes, wherein the first and second inverter-synchronous rectifiers are each capable of functioning as an inverter and as a synchronous rectifier.

8. The circuit of claim 7, wherein the first inverter-synchronous rectifier is configured as an inverter and the second inverter-synchronous rectifier is configured as a synchronous rectifier.

9. A method comprising:
determining whether a first battery cell should be charged or discharged based on a first cell voltage of the first battery cell;
if the first battery cell should be discharged, then:
- discharging a first voltage of the first battery cell into an energy store by:
  - controlling a first set of one or more semiconductor switches coupled to the energy store at a first node;
  - controlling a second set of one or more semiconductor switches coupled to the energy store at a second node;
- selecting a second battery cell to charge based on a second cell voltage of the second battery cell; and
- reversing a polarity of the first and second nodes to charge the second battery cell by controlling the first and second sets of semiconductor switches; and if the first battery cell should be charged, then:
- selecting the second battery cell to discharge based on the second cell voltage of the second battery cell;
- discharging a second voltage of the second battery cell into the energy store by controlling the first and second sets of semiconductor switches; and
- reversing the polarity of the first and second nodes to charge the first battery cell by controlling the first and second sets of semiconductor switches.

10. The method of claim 9, further comprising:
closing the first and second sets of semiconductor switches after a period of time to stop charging or discharging based on an inductor value of a first inductor of the energy store.

11. A system comprising:
a first set of one or more semiconductor switches coupled to a first node and a first terminal of an energy store configured to store energy;
a second set of one or more semiconductor switches coupled to a second node and a second terminal of the energy store, each of the first and second sets of semiconductor switches being configured to couple to a terminal of a first battery cell and a second battery cell;
the first battery cell coupled in series to the second battery cell; and
a controller coupled to the first and second sets of semiconductor switches, the controller configured to:
- control a first switched connection by regulating the first set of semiconductor switches;
- control a second switched connection by regulating the second set of semiconductor switches;
- discharge a first voltage of the first battery cell into the energy store by controlling the first and second sets of semiconductor switches; and
- reverse a polarity of the first and second nodes to charge the second battery cell by controlling the first and second sets of semiconductor switches.

12. The system of claim 11, the controller further configured to:
select to discharge the first battery cell based on a first cell voltage of the first battery cell; and
select to charge the second battery cell based on a second cell voltage of the second battery cell.

13. The system of claim 11, wherein the energy store comprises a first inductor for storing energy.

14. The system of claim 13, the energy store further comprising a second inductor for storing energy, wherein the first and second inductors are coupled in a transformer-like manner.

15. The system of claim 13, wherein the controller sets a time for closing the first and second sets of semiconductor switches based on an inductor value of the first inductor.

16. The system of claim 11, further comprising:
a first inverter-synchronous rectifier coupled to the first and second nodes;
a third set of semiconductor switches coupled to a third node;
a fourth set of semiconductor switches coupled to a fourth node; and
a second inverter-synchronous rectifier coupled to the third and fourth nodes, wherein the first and second inverter-synchronous rectifiers are each capable of functioning as an inverter and as a synchronous rectifier.

17. The system of claim 16, wherein the first inverter-synchronous rectifier is configured as an inverter and the second inverter-synchronous rectifier is configured as a synchronous rectifier.

* * * * *